United States Patent [19]

Bzdula et al.

[11] 4,409,362

[45] Oct. 11, 1983

[54] RESIN-OIL SHALE COMPOSITE REACTION PRODUCT

[75] Inventors: Joseph A. Bzdula, Fulton; Howard W. Sibley, Baldwinsville, both of N.Y.

[73] Assignee: Carrier Corporation, Syracuse, N.Y.

[21] Appl. No.: 377,529

[22] Filed: May 12, 1982

[51] Int. Cl.³ .............................................. C08F 8/00
[52] U.S. Cl. ................................... 525/54.5; 521/82; 521/101; 524/67
[58] Field of Search ....................... 525/54.5; 524/67; 521/82, 101

[56] References Cited

U.S. PATENT DOCUMENTS

| | | | |
|---|---|---|---|
| 2,874,149 | 2/1959 | Applegath et al. | 528/389 |
| 3,072,593 | 1/1963 | Marx et al. | 524/67 |
| 3,238,175 | 4/1966 | Marx et al. | 524/67 |
| 3,284,390 | 11/1966 | Scheibli et al. | 525/54.5 |
| 3,890,262 | 6/1975 | Economy et al. | 525/54.5 |
| 4,130,474 | 12/1978 | Anthony | 71/32 |
| 4,316,829 | 2/1982 | Roberts | 525/54.5 |
| 4,378,447 | 3/1983 | Grossi et al. | 525/54.5 |

*Primary Examiner*—Melvyn I. Marquis
*Attorney, Agent, or Firm*—Sughrue, Mion, Zinn, Macpeak, and Seas

[57] ABSTRACT

Oil shale, more precisely the organic components thereof, or the organic components extracted therefrom, is reacted with a resin or resin precursor reactive therewith, e.g., an epoxy resin, typically in the presence of a curing agent. The resulting composite product illustrates characteristics similar to that of the cured reactive resin or resin precursor. A process for forming such composites is also disclosed.

10 Claims, No Drawings

RESIN-OIL SHALE COMPOSITE REACTION PRODUCT

BACKGROUND OF THE INVENTION

1. Field of the Invention

The present invention relates to resin-oil shale composite reaction products or resin-oil shale organic components composite reaction products and to a process for forming the same.

2. Description of the Prior Art

Oil shales are typically fine-grain rocks resulting from the consolidation of mud, clay or silt, typically containing on the order of 20 to 50 gallons/ton or more of an organic, oil-yielding material called kerogen. Large oil shale deposits are found in the United States in Colorado, Utah, Wyoming and Texas. Kerogen is wax-like in nature, is characterized by low solubility in hydrocarbon solvents and typically will not flow unless heated to above 400° F. A typical sample of Green River shale from Colorado has the following composition: kerogen 21.6%, dolomite and calcite 38.4%, analcite 17.1% and quartz 12.1%.

Whenever the term "oil shale" is used herein, it is to be understood that this term is intended to include all kerogen containing rocks, regardless of their common or scientific designation.

The kerogen of oil shales is not an oil, such as petroleum, nor is it a semi-solid such as bitumen or asphalt. It does, however, yield a mixture of hydrocarbons and certain nitrogen and phenolic compounds, usually called "shale oil", upon pyrolytic conversion.

Kerogen may be separated from oil shale by various procedures as described in, e.g., co-pending U.S. Application Ser. No. 191,061 Howard Sibley, and by various procedures as described in the DESCRIPTION OF THE PRIOR ART therein, which co-pending U.S. Application is hereby incorporated by reference. For instance, see U.S. Pat. No. 4,130,474 Anthony et al. which discloses a solvent process for partially extracting kerogen from oil shale without destructive distillation.

U.S. Pat. No. 3,072,593 Marx et al. discloses molded articles produced from a mixture of oil shale and solid olefin polymer while U.S. Pat. No. 3,238,175 Marx et al. relates to the manufacture of the same type of molded articles but including only spent oil shale. Neither of these patents suggests in any fashion a reaction between the organic constituents of oil shale or kerogen and a resin nor do they contemplate the use of a curing agent as per the present invention. Rather, both of these patents merely contemplate the use of oil shale as an inert filler. Per the present invention, of course, all organic constituents of oil shale (including kerogen) are highly reactive components which interact with a reactive resin or resin precursor, typically in the presence of a curing agent, to form a composite product.

SUMMARY OF THE INVENTION

In accordance with the present invention, the organic components of oil shale are reacted with a resin or resin precursor reactive therewith, generally in the presence of a curing agent, to provide a composite product illustrating characteristics similar to that of the reactive resin or resin precursor product.

DESCRIPTION OF THE PREFERRED EMBODIMENTS

Hereafter, for brevity, both reactive resins and resin precursors will generally merely be referred to as a reactive resin for brevity. The difference therebetween is later explained.

Oil shales in general are useful in the present invention. However, since the present invention is predicated upon reaction of the organic materials present in the oil shale (often merely termed "organics" herein), it is generally preferred in accordance with the present invention that oil shales of high organic content be utilized, for instance, those which can be characterized as having a minimum oil content—which reflects the kerogen content—of 15 gallons/ton of oil shale as determined by the Fisher Assay Technique.

Oil shales comprise, as primary organic phases, a bitumen phase which is non-polar in nature and a kerogen phase which is polar in nature. It is the organic phases of the oil shale which are the reactive components therein required per the present invention since organic material separated from oil shale can be used instead of oil shale per the present invention. Thus, it is generally preferred that oil shales having a high organic content be utilized, although oil shales having a minimum oil content as above exemplified are useful herein. In this regard, it appears that the inorganics in the oil shale neither help nor hinder the reaction herein.

Since an actual chemical reaction occurs between the oil shale (or organics therein) and the reactive resin per the present invention, it is generally preferred that the oil shale be comminuted prior to reaction in the present invention so as to increase the area of contact between the oil shale, reactive resin and curing agent.

The exact size selected is not critically important, but the general trend noted is that the smaller the particle size of the oil shale, the better the contact between the oil shale, reactive resin and curing agent.

While size can vary greatly, it has been discovered that oil shale ground to a particle size of about 100 mesh pass or less is easily obtained using conventional commutation apparatus and offers excellent results per the present invention. Larger particle sizes can be used, but a slower reaction time is generally encountered.

With respect to the minimum particle size used, this can be freely selected and is generally determined by the energy requirements of commutation and the equipment available, i.e., commutating to an extremely small size is prohibitively expensive and requires sophisticated equipment, and thus even in the currently preferred embodiment commutation is merely to 100 mesh pass or slightly less.

Other than commutation, assuming that the oil shale is not of the desired size, no pre-treatments are necessary per the present invention. However, the organics present can be extracted by any of the procedures earlier mentioned, if desired. When the organics are used instead of oil shale, the amount of organics used in free form generally corresponds roughly to the amount of organics in the ground oil shale. Since oil shale contains substantial proportions of inorganics, the amount of organics used will substantially be less than the amount of oil shale used, but the amount of "free" organics is selected so as to generally correspond to the amount of organics in a corresponding amount of oil shale. Extraction costs for organics are high, and the use of "free" of extracted organics is not currently preferred.

Of course, oil shale/organics mixtures may be used, but again the extra cost of organics extraction must be considered. If used, the relative ratios thereof can be freely varied and if oil shale poor in organics is used, this embodiment of the invention might be attractive since the organic level of such an oil shale can thus be upgraded.

In the following discussion, proportions are with reference to oil shale; if free organics are used, essentially a lesser but reactively corresponding amount is used except, of course, inorganics are not present.

We believe that the kerogen present in the organics probably represents the most reactive portion of the organics, with the bitumen and other organic components being relatively less reactive than the kerogen. In this regard, we do not currently contemplate kerogen separation from bitumen but, if desired, kerogen could be separated from bitumen present and the kerogen per se used. One must keep in mind that if an organic separation is done, however, one loses the inherent "filler" characteristics or the inorganics in the oil shale, one major benefit of the present invention.

With respect to the ratios of oil shale to resin reactive therewith, several factors must be balanced to decide the exact amount selected. Generally speaking, the greater the amount of reactive resin used, the greater the cost of the final composite product and the closer the qualities of the final composite product to those of the virgin reactive resin.

On the other hand, the greater the proportion of oil shale, the lower the cost and the further the properties of the final composite reaction product will be from those of the virgin reactive resin.

Since one generally desires to retain the characteristics of the virgin reactive resin but lower cost, it will easily be appreciated by one skilled in the art that selection of the exact oil shale/reactive resin ratio will be a balance of desired product cost—to be as low as possible—against final composite reaction product characteristics—generally to be as close as possible to those of the virgin reactive resin.

Thus, the maximum proportion of reactive resin is cost-determined, i.e., obviously the greater proportion of reactive resin the closer product characteristics will be to the virgin reactive resin but the higher the cost. Accordingly, from a reaction viewpoint the maximum proportion of reactive resin can be freely selected since the reactive resin/curing agent combination is inherently self-curing.

On the other hand, the maximum proportion of oil shale is more important since at exceedingly high proportions of oil shale various desired properties may be too remote those of the virgin reactive resin to provide desired results.

Current results indicate that proportions on the order of 20% reactive resin and 80% oil shale (or an equivalent amount of kerogen) provide a cure rate which is acceptable and physical properties on the order of 50 to 60% that of the reactive resin. Higher proportions of oil shale can be used in certain instances, but at higher proportions of oil shale inorganic carbonate therein appears to out-gas during curing and to increase the porosity of the reaction product. While I thus prefer to use no more than about 80 wt. % oil shale, I believe that greater amounts can be used if heat and pressure are used to effect curing to reduce inorganic carbonate out-gassing and provide a more uniform product.

To exemplify various blending proportions which can be used, with a 4:1 reactive resin(epoxy):oil shale blend (by weight), strength and impact resistance values substantially equivalent to those of the reactive resin were obtained. With a 2:1 reactive resin(epoxy):oil shale blend (by weight), 80% tensile properties and impact strength values were obtained as compared to the reactive resin. With a 1:4 reactive resin(epoxy):oil shale blend (by weight), tensile and impact strength values were on the order of 50% those of the reactive resin.

Thus, balancing all factors, our currently most preferred operational range is from about 80 wt. % reactive resin and 20 wt. % oil shale to about 20% reactive resin 80% oil shale, basis being 100% composite reaction product.

The present invention basically contemplates the use of two types of systems:

(1) 3-component systems in which the three components are reactive resin or resin precursor/promoter, catalyst or initiator and oil shale;

(2) 2-component systems in which the components would be reactive resin or resin precursor and oil shale.

Turning now to the reactive resin or resin precursor used in the present invention, the primary characteristic which they must illustrate is that they must either cross-link or undergo a polymerization reaction with the organic components in the oil shale or the separated organic components. We believe the main difference here to be that thermosetting materials will form a cross-linked system whereas a thermoplastic reactive resin will form a straight chain polymer which will not be cross-linked.

The organic constituents in oil shale, primarily kerogen and bitumen, are very complex materials and contain a number of different types of reactive groups, all of which should serve as active reaction sites with one or more appropriate reactive resins or resin precursors to form the composite reaction product of the present invention.

Thus, while the majority of the reactive groups in the organics may indeed be olefinic in nature, it appears that substantial proportions of active amino, carboxy, phenolic and other groups are also present in oil shale and can serve as active reaction sites to form the composite reaction product of the present invention.

For example, as described in Kirk-Othmer, a typical Green River shale oil contains 40 wt. % hydrocarbons and 60 wt. % organic compounds which contain nitrogen, sulfur and oxygen. The nitrogen occurs in ring compounds with nitrogen in the ring, e.g., pyridines, pyrroles, as well as in nitriles, and it comprises 60 wt. % of the non-hydrocarbon organic components. Another 10 wt. % of these components are sulfur compounds which exist as thiophenes and some sulfides and disulfides. The remaining 30 wt. % is oxygen compounds which occur as phenols and carboxylic acids.

The present invention is thus not particularly limited as to the exact reactive resin(s) or resin precursor(s) used, rather, is of broad application with various different resins and different resin precursors as later discussed.

With respect to the use of one or more reactive resins or one or more resin precursors, the essential difference between these two materials is that a reactive resin is, prior to reaction per the present invention, polymeric in nature and reacts with active groups in the organics to yield what might be viewed as a reactive resin-organics "graft polymer". In distinction, a resin precursor is not technically polymeric in nature, rather, is typically a compound and reacts with the organics to yield what might be viewed as a resin precursor-organics "copolymer".

We believe that both can be used with equal success in the present invention, though currently, as will later be discussed in detail, the use of one or more reactive resins may be preferred.

The critical factor that any reactive resin or resin precursor must exhibit is, of course, that it contain groups or moieties which are reactable with corresponding groups or moieties in the oil shale. If, for example, a reactive resin is used which has no reactive sites available, firstly such would not be a "reactive" resin and such is not contemplated herein since in this instance one would essentially be forming a blend of (non) reactive resin and oil shale (or the organics therein). In similar fashion, as will be apparent from the use of the term "resin precursor", if a resin precursor cannot react with groups present in the oil shale, such is not contemplated as useful in the present invention since in this instance one again is only forming a simple blend, not a oil shale-reaction product as is desired herein.

General conditions of reaction are given for various reactive resins and resin precursors at later portions of this specification.

As a general rule, however, we wish to make it clear that we do not believe reaction conditions to be overly restricted. Further, since various types of reactive resins and resin precursors can be used, it is impossible to give any all encompassing rule of great specificity. However, there are several general, common sense rules which we believe to apply.

Firstly, theoretically catalysts, promoters or initiators (these terms are treated interchangeably herein) are not always necessary. It must be remembered, however, that we are dealing here with a system which does contain substantial proprotions of materials essentially inert to reaction, i.e., the inorganics of the oil shale. Thus, as a practical matter we believe that a catalyst, promoter or initiator will generally be used. One would generally select such a material by a review of prior art dealing with analogous reactions. For instance, assuming one is dealing with the reaction of an epoxy resin and oil shale, one would generally select a catalyst, initiator or promoter as is used in the prior art for curing epoxy resins.

With respect to temperature, again theoretically we believe reaction can be at room temperature. However, as a practical matter it appears that reaction is accelerated at higher temperatures and thus we believe it will generally be the case that reaction will be at a temperature above room temperature. The exact temperature selected would, of course, depend upon the reaction system at issue.

We do not currently believe that the maximum temperature selected is overly important and, given the various reaction systems involved, the temperature can be relatively freely selected. However, common sense does dictate that if a solvent is used the temperature selected should not be so high as to cause excessive solvent volatization which might create problems nor, of course, would the temperature selected be such as to degrade any reaction product formed.

As later explained, the time of reaction is non-critical, and can be freely selected.

The pressure of reaction also appears to be relatively non-important, through where reaction is promoted by low or high pressures, of course one would generally use such pressures.

Amounts of components are later discussed and we will not repeat such discussion here other than to indicate that we currently believe that when a catalyst, curing agent or promoter is used it must obviously be used in an amount sufficient to effect the desired reaction between the organics in the oil shale and the corresponding reactive resin or resin precursor. No fixed limit can be set, but we believe amounts along the line as are used for the corresponding reaction between a chemical compound or monomer (analogous to a resin precursor) or polymer should be used with equal success in the present invention after one assays the oil shale for the proportion of reaction groups present.

Broad classes of reactive resins contemplated as useful in the present invention are phenolic resins, melamine resins, polyester resins, acrylonitrile-butadiene-styrene copolymers, urethane resins and, most preferably, epoxy resins. We believe the key to utilizing a reactive resin successfully in the present invention is to ensure that reactive groups exist in the resin which are capable of interacting with reactive groups in the oil shale.

Broad classes of resin precursors contemplated as useful herein include compounds reactive with the olefinic, phenolic, amino, carboxy or other groups in the organics to yield the desired resin or polymer product. In this instance, we believe the reaction conditions selected should be similar to those used in the industry to form the corresponding resins per se. For instance, conditions such as pressure, temperature, time, curing agent or catalyst, etc., as are conventionally used in the art should be useful with success in the present invention as later discussed.

Thus, for example, if an olefin polymerization or reaction is involved, we believe the reaction can be initiated (activation of the double bond) by heating, irradation, ultrasonics or initiators as known in the art. The initiation of the chain reaction will probably be observed most clearly with radical or ionic initiators which are energy-rich compounds which can add suitable unsaturated compounds (monomers) and maintain the activated radical, or ionic, state so that further monomer molecules can be added in the same manner.

The amount of resin precursor is generally determined to ensure substantially complete reaction with reactive groups in the oil shale. Since oil shale may have varying compositions, generally one will assay the oil shale and then empirically determine the amount of resin precursor needed. For example, if a phenol-aldehyde resin is the desired resin product after reaction, typically one would take a given amount of oil shale and add thereto increasing amounts of aldehyde, e.g., formaldehyde, conducting reaction with different amounts of aldehyde until the optimum amount of aldehyde reacting with oil shale is found.

The reaction between a phenolic group and an aldehyde is a condensation type reaction in which water is formed as a by-product. Single-stage phenolic resins (resols) are produced with an alkaline catalyst; the chains which result are thermoplastic in nature prior to crosslinking, but as temperature is increased the reaction between the phenolic groups and aldehyde is completed, producing an infusible crosslinked material.

A two-stage resin (novolak) is produced by the reactive groups and aldehyde in the presence of a conventional acid catalyst. Often reaction can be completed by adding hexamethylenetetraamine (hexa) and upon heating, the hexa breaks down into ammonia and formaldehyde and forms crosslinking bridges between the resin molecules to form a thermoset product.

We believe that both resols and novolaks can be used with success in the present invention.

Thus, one contemplated resin precursor-base system involves mixing ground oil shale as earlier described having a known proportion of phenolic groups (assayed) with an aldehyde, e.g., formaldehyde, at a 40% formaldehyde/60% phenolic group ratio and heating at 175° to 195° F. Amino groups present in the oil shale should act as a catalyst for this system to promote crosslinking of the phenol-formaldehyde resin which results. For example, in this instance the general conditions taught in U.S. Pat. No. 1,252,507, incorporated by reference, should prove useful where the condensation of phenols and formaldehyde is effected in the presence of small quantities of alkalies, ammonia or organic bases, and we consider the amino groups in the oil shale the equivalent of the alkalis, ammonia or organic bases. Although we do not currently contemplate using additives such as turpentine, etc., disclosed in this patent, temperatures as disclosed therein should be useful herein.

Nylons are polymeric amides with aliphatic or aromatic chain segments connected by amide linkages. The nylon family is typically divided into two classes. The first consists of nylons made by condensing a diamine with a dibasic acid, for instance, hexamethylenediamine with adipic acid. A second class of nylons is made from monomers having both the acid and amine functions, for example, polycaprolactam which is made from epsilon-caprolactam. We believe the first class of nylons (condensing a diamino moiety in the oil shale with a dibasic acid) to be useful herein and suspect that the second class of nylons will also be useful.

The presence of the amide groups in the polymer chain, and hence the hydrogen bonding between chains, distinguishes nylon materials from such materials as polyolefins. Further, U.S. Pat. No. 2,268,586, incorporated by reference, discloses conditions which should be useful for the preparation of polyamides by reacting a material which has only two amide-forming groups with a complementary group in oil shale, for example, a carboxyl group in oil shale. Heating is at from 4 to 10 hours at temperatures from 100° to 200° C. and then for 15 minutes to 2 hours at temperatures above the melting point of the resulting polymer. These conditions should prove to be useful to effect reaction per the present invention.

Another contemplated system is based upon the amino groups present in oil shale. After assaying the oil shale to determine the proportion of amino groups present, the necessary or desired amount of a diacid, e.g., adipic acid, is added to the ground oil shale and the system is heated to effect a condensation polymerization to result in a product similar to nylon.

The amino resins are thermosetting polymers which are essentially formed by reaction of an aldehyde with compounds which contain the amino group—$NH_2$. Urea-formaldehyde and melamine-formaldehyde resins are the most common examples of this class of polymer. The application of heat, in the presence of acid catalysts, converts these materials into hard, infusible materials. The nature of the product can be varied by selecting the pH, reaction temperature, reactant ratio, type of moiety in which the amino group is present and degree of polymerization. In this regard, we believe that curing agents as disclosed in U.S. Pat. No. 2,995,541, hereby incorporated by reference, urea components and aldehydic components as disclosed therein should be useful in the present invention. Thus, we believe the addition of a trimethylolalkane as disclosed in that patent to oil shale in a hydrocarbon, alcohol or other solvent and then baking at between 65° and 200° C. should permit a urea-type resin to be formed.

In the instance that high pressure operation will be acceptable, which we do not believe will be preferred or the general rule, the reaction described in U.S. Pat. No. 2,874,149, hereby incorporated by reference, involving the production of cyclic and polymeric ureas from carbon monoxide and sulfur and organic diamine linkages present in oil shale should be applicable to the present invention. While the compounds which should be formed by this reaction can be generally characterized as ureas, and no added catalyst is necessary, albeit an alkaline catalyst can be used, it would appear that this reaction would require a minimum pressure of around 30 psia to form the desired urea, and since other systems per the present invention do not require such high pressure operation, this particular contemplated embodiment will, we believe, prove to be of marginal interest.

Thus, if a particular oil shale were to contain substantial proportions of urea, an aldehyde such as formaldehyde could be added to result in the formation of an ureaformaldehyde resin.

Other resin precursors which may also be useful herein include methylmethacrylate, styrene and other vinyl esters, furfuryl alcohol—which should react with phenolic groups in the oil shale under conditions as set forth in U.S. Pat. No. 2,435,704, hereby incorporated by reference—in combination with cross-linking agents such as multifunctional acrylates and methacrylates, divinylbenzene and initiator/promoter systems such as MEK peroxide, cobalt naphthanate, dimethylaniline, benzoyl peroxide, dimethyl-p-toluidine or curing agents such as benzene sulfonic acid, p-toluene sulfonic acid, and primary and secondary amines; these systems are similar to those used in forming plastic/aggregate composites such a polymer concrete.

For the situation where one wishes to react with the olefinic bonds in the oil shale, we believe that comonomers (resin precursors) as are typically used in the art to form copolymers with polyethylene and polypropylene should be useful with success in the present invention. For example, consideration should be given to the use of ethyl acrylate and vinyl acrylate as useful resin precursors in this instance. A problem which might be encountered is, however, that copolymers of this type are typically formed by high pressure procedures, and it may be that as a practical matter the apparatus required to practice such an embodiment of the invention will be prohibitively expensive; similar remarks apply to forming a methylacrylate-based copolymer.

In this regard, the use of catalysts as are disclosed in U.S. Pat. No. 2,765,297, hereby incorporated by reference, may prove to be beneficial to avoid the use of high pressure procedures for polymerization predicated upon olefinic groups in the oil shale. As disclosed in that patent, especially ethylene is difficult to polymerize using single catalysts such as benzoyl peroxide, potassium persulfate, etc., but the 2-component catalyst systems therein enable ethylene polymerization to be achieved over a wide range of temperatures and pressures.

Thermoplastic polyesters such as polyethylene terephthalate (PRT) and polybutylene terephthalate (PBT) are produced by a polyesterification reaction between a glycol and a dibasic acid. Thus, per the present invention, if acid groups are present in the oil shale, we believe the present invention can be successfully practiced using a glycol as a resin precursor.

Polyester systems can be designed for room-temperature or high-temperature cure. Typically the polyester is supplied in liquid form as a mixture of resin and monomer, usually styrene. The amount of monomer is the major determination of viscosity. The addition of a catalyst and its subsequent activation, usually by heat, causes crosslinking and the polyester and monomer are transferred into a strong, 3-dimensional polymer.

The catalyst usually is an organic peroxide such as benzoyl or methylethylketone peroxide.

For room temperature cure, an accelerator promotes the cure.

Polyurethanes are derived from the reaction of multifunctional alcohols with polyisocyanates. Since it is desirable that the reactants be in the liquid phase, the number of multifunctional isocyanates easily available on the market is limited. Those most commonly used include tolylene diisocyanate and methylenediphenylene isocyanate, used for flexible and rigid foams, respectively.

This may well prove to be a highly beneficial aspect of the present invention since the isocyanate function not only reacts with alcohol (OH) groups to form urethane but also reacts with amines, carboxylic acids, phenols and water, the latter reaction forming carbon dioxide which can be used as a blowing agent.

For practical reasons, the majority of polyhydroxy compounds have molecular weights between 300 and 6,000 and we contemplate these types of materials as being useful in the present invention where the oil shale has only a low (OH) group content and one wishes to increase the same.

Since polyurethanes are addition polymers, the basic condition necessary for network build up is the reaction of difunctional (normally isocyanates) with trifunctional moieties. The high reactivity of the isocyanate group, however, should allow cross-linking with amines at low temperatures and with stannous or stannic tin catalyzed polyols groups at ambient temperatures.

We contemplate that standard flexible, semi-rigid and rigid polyurethane foam technology will generally be applicable to the present invention.

For instance, assume that one wished to form a flexible polyurethane foam containing substantial proportions of oil shale per the present invention. A typical reaction system might include tolylene diisocyanate (80/20, 4;2,6 isomer), water, amine catalyst, stannous tin catalyst and a silicon surfactant, reaction in this case being, we believe, with alcohol (OH) groups present in the organics of the oil shale. Under controlled temperature and with efficient mixing, a flexible polyurethane foam containing substantial proportions of oil shale should be achievable.

A rigid polyurethane foam might be formed, on the other hand, by using polymeric methylene diphenyl diisocyanate (functionality 2.2-2.8) which would react with hydroxyl groups in the oil shale in the presence of a tertiary amine catalyst, silicone surfactant and, for example, a chlorofluorocarbon blowing agent with small amounts of water being optional. Unlike flexible foams, the function of the surfactant is to maintain a network of fluorocarbon containing cells which are sealed off from each other by the highly crosslinked polyurethane.

Semi-rigid foams can also be contemplated where the oil shale contains hydroxyl group containing moieties having a functionality of 3.0 to 3.5, again using a mixture of catalyst, water and polymeric MDI.

Since substantial proportions of carboxylic acid groups are present in oil shale, the same should be reactable with ethers such as bis(2,3-epoxycyclopentyl) ether following the procedure of U.S. Pat. No. 2,921,925, hereby incorporated by reference, in the presence of an acidic catalyst as disclosed therein and then curing at a temperature of from 50° C. to 200° C. for from several minutes to several hours. As can be seen by reference to the U.S. patent under discussion, many different kinds of carboxylic acids appear to be amenable to processing.

U.S. Pat. No. 4,312,965 teaches a process for forming amine/amide polymers where a hydrocarbon polymer having olefinic double bonds is contacted with a nitrogen containing compound selected from ammonia or a monomeric primary or secondary amine, water and carbon monoxide using rhodium atoms as a catalyst at 50° to 250° C. and at a 30 to 300 atmospheres. Except for the substantial disadvantage of using an expensive catalyst such as a rhodium catalyst and high pressures, the described process should be useful to form the composite of the present invention since both olefinic and amine groups are present in oil shale.

Other systems will be apparent to one skilled in the art.

We currently believe that the amount of resin formed when using a resin precursor is simlar to the amount of reactive resin blended with the oil shale when a reactive resin is used. Thus, in the case of using a 20 wt. % reactive resin: 80 wt. % oil shale system as earlier exemplified, we believe that if the composite reaction product in the case of using a resin precursor contains at least about 20 wt. % resin—which essentially includes the resin precursor and the organics in the oil shale—and 80 wt. % oil shale—which essentially includes the inorganics in the oil shale—the results should be approximately those obtained using a reactive resin. The upper limit on the amount of resin precursor is not easily determined since we are here in situ forming a resin whereas in the case of using a reactive resin we have reactive resin as a starting material. We believe about 80 wt. % total organics—organics in the oil shale and reacted resin precursor—should prove to be a reasonable maximum.

The resin precursors used in the present invention are all commercially available and can be purchased from well known suppliers.

We typically also purchase reactive resins commercially and currently prefer to use an epichlorohydrin-bisphenol A reaction product available from Shell Oil Co.; the diglycidyl ether of bisphenol A is commonly abbreviated DGEBA in the art and is usually a liquid resin, though in some instances such are available as a solid resin in an appropriate diluent or diluent mixture. Unless otherwise indicated, the following deals with the preferred epoxy resin system of the present invention.

Epoxy resins must be cured with cross-linking agents (hardeners) or catalysts per the present invention. The epoxy and hydroxyl groups are the reaction sites through which crosslinking occurs. We believe conventional crosslinking agents (hardeners) can be used with success in the present invention, and such include amines, anhydrides, aldehyde condensation products, novolaks and Lewis acid catalysts.

For example, aliphatic amines such as diethylenetriamine and triethylenetetraamine can probably be used with success where room temperature cures are desired; on the other, we believe that where elevated temperature cures are acceptable aromatic amines such as ethylene dianiline can be used.

The main properties of interest with respect to to an uncured epoxy resin are epoxide equivalent and viscosity. The epoxide equivalent indicates the number of grams containing 1 gram-mole of epoxy groups. Once the epoxide equivalent is known, it is possible in many instances to calculate the optimum amount of curing agent required. For example, assuming the curing agent is diethylene triamine (DETA), this has five active hydrogens per molecule and an amine equivalent weight of 20.6. Assuming DGEBA with an epoxide equivalent of 180, then 10.2 phr of DETA will be needed for curing. In the case where the amount of curing agent cannot be calculated, it is empirically determined in a conventional manner.

The viscosity of the resin is a convenient index of its handling characteristics.

We generally prefer to use liquid epoxy resins but believe solid epoxy resins in a diluent or diluent mixture are also useful. For instance, we believe the Epon materials from Shell Chemical Co. can be used with success in the present invention as can the Epikote materials. The latter commercially available products have a viscosity in poises at 25° C. of 7 to 150 and are liquid or semi-solid, the semi-solids being used in a diluent. Typically diluents used for epoxy resins include butyl glycidyl ether, phenyl glycidyl ether, xylene, acetone, MEK:toluene, MIBK:xylene, etc. The epoxy resins cured comprise more than one

group. For example, see the materials disclosed in U.S. Pat. No. 2,904,531 at Col. 5, line 49 to Col. 6, line 14, hereby incorporated by reference. The epoxy resins disclosed in Epoxide Resins, W. G. Potter, London, 1970, Iliffe Books, at pages 33–36 should also be useful in the present invention, specifically those liquid epoxy resins or those solid epoxy resins in a diluent or diluent mixture which are capable of further cure upon reaction with oil shale or kerogen. We also believe the materials disclosed in Handbook of Epoxy Resins, Lee et al., McGraw-Hill Book Company, 1967 at pages 4–66 and 4–67 should be useful, subject to the same restrictions as above. Another class of epoxy resins which we believe to be useful will be the novolaks, particularly of the epoxy cresol type and the epoxy phenol type. These are produced by reacting a novolak resin, usually formed by the reaction of o-cresol and phenol and formaldehyde with epichlorohydrin.

The Potter text also sets forth various typically used curing agent amounts and calculations for determining the optimum amount of curing agent used at pages 62–84.

Conventional curing agents can be used in the present invention in conventional amounts, and will generally be used when one desires a rapid curing system. As earlier indicated, of course, in those instances where the oil shale contains a group or moiety which will serve as a curing agent or reaction catalyst, groups or moieties present in the oil shale serve as a curing agent or reaction catalyst. In many cases, however, an active group or moiety in the oil shale will not serve a curing agent or catalyzing function, and in this instance it is desired to add such a curing agent or catalyst. While DETA and triethylene tetraamine (TETA) are currently preferred for epoxies, we believe that in general tertiary amines, primary and secondary polyamines, dicyano diamides and polyamides in addition to anhydrides of polybasic carboxylic acids such as phthalic anhydride, pyromellitic anhydride and the like such as hexahydrophthalic anhydride and chlorendic anhydride can be used with success in the present invention.

For instance, one might use 8–12 phr for DETA, 10–14 phr for TETA, etc. As earlier indicated, useful curing agents, proportions and cure times are disclosed in detail in the Potter reference above incorporated by reference at pages 62–84.

Of course, the amount of curing agent should generally be increased over that needed for the reactive resin alone to account for the oil shale—most especially, the kerogen therein. Usually we find it convenient to just treat the kerogen present as reactive resin or resin precursor for purposes of determining curing agent amounts, e.g., if a reactive resin would require 10 phr DETA and such is reacted with an oil shale containing an equal weight of kerogen, we generally just double the amount of curing agent, for convenience. This rule is not absolute, however, and greater or lesser amounts of curing agent(s) can be used depending upon the particular reaction system.

A currently most preferred epoxy resin for use in the present invention is available from Shell Oil Co. under the tradename Epon 815; this has an epoxy equivalent weight of 175–195, a viscosity at 25° C. in centipoises of 500–700 and is diluted with 11% butyl glycidyl ether.

One benefit of using epoxy resins should be that they exhibit low shrinkage during cure. The epoxy resins are, of course, characterized by the epoxide groups (oxirane rings), and most widely used are diglycidyl ethers of bisphenol A, made by reacting epichlorohydrin with bisphenol-A in the presence of an alkaline catalyst.

Typically the composite reaction product of the present invention is obtained by intimately mixing the oil shale (or kerogen) with the reactive resin desired in the presence of a curing agent.

Depending upon the curing agent selected, thereafter the system can be allowed to cure (cross-link in the case of a thermosetting resin; polymerize in the case of a thermoplastic resin) at room temperature and pressure.

If expedited curing is desired, heat and pressure can be used. For example, 250° F. and up to 2 psig in the case of an epoxy resin.

However, cure times are not overly important per the present invention insofar as product properties are concerned, rather, are only important from the commercial viewpoint of processing time. Should a slower or more rapid cure time be desired, such can be freely altered by selection of conventional curing agent-catalyst-promotor/pressure temperature combinations.

Curing times are generally on the order of those required for the reactive resin/curing agent selected. For instance, for epoxies typical cure schedules for DETA and TETA should be 1 hour at 100° C. If one uses a curing agent such as a DETA-ethylene oxide adduct as is known in the art, we believe a fast room temperature cure will be obtained, and that heat or a catalyst as is known in the art can be used to accelerate the process.

In this regard, should an oil shale contain substantial proportions of sulfur compounds such as poly(di)sulfides, one can contemplate reaction with an epoxide following the procedure of U.S. Pat. No. 2,789,958, hereby incorporated by reference. The resulting "polymer" should be a tough rubber-like solid. A further potential value of this particular embodiment is the fact that not only should polythio polythiols potentially be useful if present in the oil shale but polythio polyhydroxy compounds should also be useful; thus, in the case of a complex oil shale system where "thiol" and "hydroxy" groups are present, reaction with a polyepoxide should readily proceed. Per U.S. Pat. No. 2,789,958, compounds containing at least two epoxide groups are currently contemplated as useful in this embodiment and we postulate that the curing reaction will occur at room temperature, though higher temperatures may be employed, though it would not appear to be desirable to use temperatures sufficiently high so as to cause vaporization or boiling of the curing agent. As is the case with other epoxy resins, we believe the curing reaction of this system in general should be facilitated by the presence of aliphatic amines (catalysts), as disclosed in the indicated U.S. patent.

As should be apparent from the earlier advanced discussion, at present it does not appear that there is any critical special limit to the molecular weight of the reactive resin used or any special critical limit to the molecular weight of the product formed after reaction if one is using a reactive resin or a resin precursor. Of course, molecular weight for a resin precursor is not an important factor.

What is important is that the reactive resin or resin precursor react with the organics in the oil shale to provide a solid reaction product. This, of course, will almost always be the case when one is forming a thermosetting product, and in the case of thermoplastic product one skilled in the art will easily be able to select an appropriate reactive resin or resin precursor to give the desired characteristics.

Thus, while the above discussion regarding reactive resins has been primarily in the context of epoxy resins, we believe that the reactive groups in oil shale should be reactable with a melamine material such as triethylene melamine or diethylene melamine under the conditions as are disclosed in U.S. Pat. No. 2,582,613, hereby incorporated by reference.

As should further be apparent from the earlier advanced discussion, the exact reaction conditions selected for processing per the present invention are not overly critical in the sense that there are exact cut-offs which ensure success or failure. However, there are certain highly preferred aspects of the present invention which we believed are best observed for operation on a practical, commercial scale, and these are now discussed.

With respect to mixing the comminuted oil shale and the reactive resin or resin precursor of the present invention, this is not an overly important factor in most cases. Of course, if one is using a thermosetting resin or resin precursor in the presence of a curing agent or catalyst, one would not mix at conditions where the curing agent or catalyst would be activated prior to forming a well mixed system since overall preferential reaction with the active groups of the oil shale is desired.

Since generally it is preferred that liquid reactive resins or resin precursors be used, usually mixing is fairly easy since in liquid form the reactive resins or resin precursors are of fairly low viscosity, albeit the exact viscosity chosen is not overly important.

In those instance where a solid material is being used, usually a solvent will be used to put the same into solution, emulsion, dispersion or the like. The solvent can be freely selected from water or inert hydrocarbons though we believe it is generally preferred that a relatively low amount of solvent be used, if such is necessary, so that out-gassing is not a problem. As will be apparent to one skilled in the art, unless the solvent assists in promoting the reaction, it is preferred that the solvent otherwise be inert to the reaction.

Turning now to the pressure, temperature and time of curing (or reaction), these are primarily set based on the reactive resin or resin precursor used. We wish to emphasize that we are not using novel reactive resins or resin precursors. Thus, as a general rule, one can use the conditions of the prior art to react the reactive resin or resin precursor per se with success, taking into consideration the corresponding active group in the oil shale which is to be reacted with.

Thus, as earlier explained in some detail, for the situation where, for instance, an epoxy is being reacted with oil shale, the pressure/temperature/time of reaction will be along the lines of those used in the art to cure epoxy resins.

As a general rule, however, we believe that the process of the present invention can be practiced with success at sub-, super-and normal pressures. For instance, if one wished to insure good mixing of the oil shale and the reactive resin or resin precursor using a solvent and then to remove solvent prior to curing agent or catalyst addition, one might well wish to process at some stage at sub-atmospheric pressure to promote solvent removal. However, typically operation at atmospheric pressure is contemplated, though where the out-gassing problem as earlier mentioned is encountered, operation at super-atmospheric pressure can be considered.

We do not believe the exact pressure selected is overly important.

With respect to temperature, as will be apparent to one skilled in the art, temperature will have some effect during mixing the system and this has been earlier been discussed.

With respect to actually effecting the curing reaction or initiating catalysis, usually an elevated temperature is used, and temperatures along the lines of those earlier mentioned seem to be useful with success in the present invention. Since a number of different reaction systems are contemplated as useful herein it is impossible to delineate any specific exact range of useful application, rather, the temperature range will be set upon the components being reacted and the activation temperature, etc., of any curing agent or catalyst used. For instance, we earlier suggested for a phenol-formaldehyde reaction system heating along the lines of 175°–195° F. and, as will be seen from the later presented Example, we heated at 250° F. These temperatures are by no means limitative and lower and higher temperatures can be used with success.

The time of reaction will obviously be highly dependent upon the reaction system involved, the amount of curing agent or catalyst and the temperature. Time is a secondary factor in the present invention since time goes more to the commercial practicality of the process of the present invention than to the operability. Suffice it to say that time can be freely selected and is simply set so as to ensure, in a typical situation, substantially complete reaction between the reactive resin or resin precursor and the organics in the oil shale.

In the instance where an acrylonitrile-butadienestyrene copolymer is used, we believe that the same should be copolymerizable with diamine groups in oil shale so long as reactive groups are present in the ABS copolymer. We contemplate that conditions along the lines of those disclosed in U.S. Pat. No. 3,006,905, hereby incorporated by reference, should be useful. It does appear, however, that very strict temperature control will probably be necessary for this embodiment of the invention, and we do not view this embodiment as overly important.

As will be apparent to one skilled in the art, if desired various additives can be added to the composite reaction product of the present invention for appropriate effects, for example, dyes, pigments or the like.

Having thus generally described the invention, the following working examples are provided of currently preferred best modes of practicing the invention.

EXAMPLE 1

Oil shale from Mohogany Ledge, Peance Creek Basin, Rifle, Colo., was obtained in an as-mined condition and comminuted to pass a 100 mesh screen.

The thus comminuted shale ore was mixed with Epon 815 resin and Epon U curing agent (which I believe to be DETA) at a ratio of 30 weight parts curing agent/100 parts reactive resin. The oil shale proportions were as set forth below. Curing was at 250° F, and 2 psig for 2 hours. The results obtained with respect to tensile strength (psi) are also set forth below.

Where more than one value is set forth, this reflects more than one run at the same processing proportions/conditions. All percentages are percents by weight based on the total system, unless otherwise indicated. The tensile strength (psi) values are an average of 2 or 3 process runs.

TABLE 1

| Oil Shale (% by weight) | Reactive Resin/ Curing Agent (% by weight) | Tensile Strength (psi) |
|---|---|---|
| 0 | 100 | 6886 |
| 50 | 50 | 3176 |
| 75 | 25 | 1135 |

As can be seen from the above results, there is an approximate, though not absolutely linear, decrease is tensile strength with increasing proportions of oil shale.

While pressure and temperature were used to cure in this EXAMPLE, curing can be effected at normal ambient either at longer times or with, e.g., the use of a conventional curing agent/catalyst combination.

Oil shale processed in a similar fashion but acid washed tended to break during processing and thus is currently non-preferred.

The composite reaction products of the present invention can be used, generally, as a replacement for a reaction product comprising the virgin reactive resin considering, of course, that the oil shale or kerogen present may degrade the color thereof for certain uses and, of course, may somewhat lower physical properties such as tensile, yield and impact strength, tensile modulus and elongation at high proportions of oil shale, though this effect is not noted a low, e.g., about 20 wt. % or less, proportions of oil shale. However, where coloration is not important and decreased physical properties are acceptable, utility is essentially the same, for instance, in engine and machine cowlings as a replacement for synthetic resin cowlings, even at relatively high oil shale/kerogen proportions.

While the invention has been described in detail and with reference to specific embodiments thereof, it will be apparent to one skilled in the art that various changes and modifications can be made therein without departing from the spirit and scope thereof.

What is claimed is:

1. A composite reaction product formed from a mixture of oil shale or organics separated therefrom, a resin or resin precursor reactive with said oil shale or organics and a catalyst agent for the reaction between the oil shale or organics separated therefrom and said reactive resin or resin precursor.

2. A composite reaction product as claimed in claim 1, wherein said oil shale is used.

3. A composite reaction product as claimed in claim 2, wherein from about 20 to about 80 wt. % of said oil shale is used in combination with about 20 to about 80 wt. % of said resin or resin precursor.

4. A composite reaction product as claimed in claim 3, wherein said resin is used in combination with said oil shale.

5. A composite reaction product as claimed in claim 3, wherein said resin precursor is used in combination with said oil shale.

6. A composite reaction product as claimed in claim 3, wherein said resin is used in combination with said oil shale and said resin is an epoxy resin.

7. A process for forming a composite reaction product between oil shale or organics separated therefrom and a resin or a resin precursor reactive with said oil shale or organics separated therefrom which comprises blending said oil shale or organics separated therefrom with said resin or resin precursor reactive therewith and a curing agent for the reaction between the oil shale or organic separated therefrom and said reactive resin or resin precursor, and thereafter effecting reaction therebetween.

8. The process of claim 7, wherein said from about 20 to about 80 wt.% of said oil shale is used in combination with about 20 to about 80 wt. % of said resin or resin precursor.

9. The process of claim 7, wherein said reaction is effected at elevated temperature.

10. The process of claim 9, wherein said reaction is effected at elevated pressure.

* * * * *